(12) United States Patent
Goto et al.

(10) Patent No.: US 6,539,739 B2
(45) Date of Patent: Apr. 1, 2003

(54) AUTOMOBILE AIR CONDITIONER

(75) Inventors: Naomi Goto, Shiga (JP); Nobuyuki Nishii, Shiga (JP); Yasufumi Kurahashi, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/074,240

(22) Filed: Feb. 14, 2002

(65) Prior Publication Data

US 2002/0148242 A1 Oct. 17, 2002

(30) Foreign Application Priority Data

Apr. 16, 2001 (JP) ........................................ 2001-116579

(51) Int. Cl.$^7$ ................................................ B60H 1/32
(52) U.S. Cl. ........................................ 62/244; 323/288
(58) Field of Search ........................... 62/244, 230, 243, 62/228.1, 236; 323/282, 284, 288

(56) References Cited

U.S. PATENT DOCUMENTS

| 5,371,645 | A | * | 12/1994 | Mochizuki | .................... | 361/22 |
| 5,408,842 | A | * | 4/1995 | Goto et al. | .................. | 318/801 |
| 5,428,967 | A | * | 7/1995 | Goto et al. | .................. | 323/901 |
| 5,714,806 | A | * | 2/1998 | Goto et al. | .................. | 307/10.1 |
| 5,811,948 | A | * | 9/1998 | Sato et al. | .................... | 318/138 |
| 5,982,161 | A | * | 11/1999 | Nguyen et al. | ............. | 323/284 |
| 6,163,088 | A | * | 12/2000 | Codina et al. | ............. | 307/109 |
| 6,181,539 | B1 | * | 1/2001 | Maejima et al. | ............. | 361/22 |
| 6,201,714 | B1 | * | 3/2001 | Liang | ........................ | 323/282 |
| 6,259,235 | B1 | * | 7/2001 | Fraidlin et al. | ............. | 323/284 |
| 6,278,910 | B1 | * | 8/2001 | Miura et al. | ................. | 318/803 |
| 6,384,558 | B2 | * | 5/2002 | Yoshida et al. | ............. | 318/441 |

* cited by examiner

*Primary Examiner*—William E. Tapolcai
*Assistant Examiner*—Mohammad M. Ali
(74) *Attorney, Agent, or Firm*—McDermott, Will & Emery

(57) ABSTRACT

An automobile air conditioner having a charging device for charging a power source capacitor preliminarily before driving a motor-driven compressor, which comprises a discharge circuit for discharging the electric charge in the capacitor through a power feeding device, and a controller for controlling the discharge by the discharge circuit. Further by comprising a cut-off detecting circuit for detecting when the battery is cut off, it is discharged automatically. Moreover, the voltage of the battery is converted, and supplied as a power source for the controller.

14 Claims, 8 Drawing Sheets

AUTOMOBILE AIR CONDITIONER

BACKGROUND OF THE INVENTION

1. Field of the Invention

The present invention relates to an automobile air conditioner having a motor-driven compressor driven by an electric power from a direct-current power source.

2. Description of the Related Art

FIG. 9 is a block diagram of a conventional automobile air conditioner having a motor-driven compressor driven by an electric power from a direct-current power source. To drive a motor-driven compressor 14, an output unit 11 (generally known as inverter circuit) converts a direct-current supply voltage into an alternating-current driving voltage. A capacitor 7 is provided to suppress the ripple voltage of the direct-current power source. When a circuit breaker 3 is closed, this capacitor 7 of a large capacity is charged from a battery 1 by way of fuse 2, circuit breaker 3, diode 4 and resistor 5. The diode 4 is intended to protect the circuit so that the current may not flow in case the battery 1 is connected in wrong polarity.

A controller 10 receives a command for operating the motor-driven compressor 14 from an air conditioner controller 12, and confirms the charge voltage of the capacitor 7 detected by a voltage detector 8. When the voltage of the capacitor 7 has reached a specified value, the controller 10 closes a relay 6. Consequently, the output unit 11 provides with a driving voltage, and drives the motor-driven compressor 14. A 12-volt power source of the controller 10 is supplied from the power source 13. Although not shown, a switching power supply unit 9 converts the voltage of the battery 1, and supplies the converted voltage to the output unit 11 and voltage detector 8.

On the other hand, when receiving a stop command of the motor-driven compressor 14 from the air conditioner controller 12, the controller 10 stops the output from the output unit 11, and opens the relay 6.

In the conventional configuration, when checking or repairing the air conditioner, first, the circuit breaker 3 is opened, and the capacitor 7 is allowed to discharge. After the electric charge is discharged sufficiently, checking or repairing can be started. In this case, the electric charge accumulated in the capacitor 7 is discharged as it is consumed by the switching power supply unit 9. This discharging, however, takes a long time because the load is light.

To shorten the discharge time, with the circuit breaker 3 being opened, the controller 10 can discharge the capacitor 7 by driving the motor-driven compressor 14 by means of the output unit 11. In this case, the discharge speed is faster, but the following problems are involved.

1. The motor-driven compressor 14 must be connected.
2. Complicated software for driving the motor-driven compressor 14 is needed. It is difficult to realize this method by a hardware circuit instead of using this software.
3. The power source 13 must be connected to the controller 10.

Moreover, a method of using other discharge resistance is known, but this method requires a discharge resistor of a large current rating, and hence the equipment size is increased.

SUMMARY OF THE INVENTION

The present invention is devised in the light of such conventional problems. The automobile air conditioner of the invention comprises a direct-current power source, a power feeding device connected in series to the direct-current power source, a switching device connected in parallel to the power feeding device, a first capacitor charged through the power feeding device from the direct-current power source, an output unit for driving a motor-driven compressor for air conditioning by receiving electric power from the switching device, a discharge circuit for discharging the electric charge in the first capacitor through the power feeding device, and a controller for controlling the discharge circuit.

DESCRIPTION OF THE PREFERRED EMBODIMENTS

Figure 1:
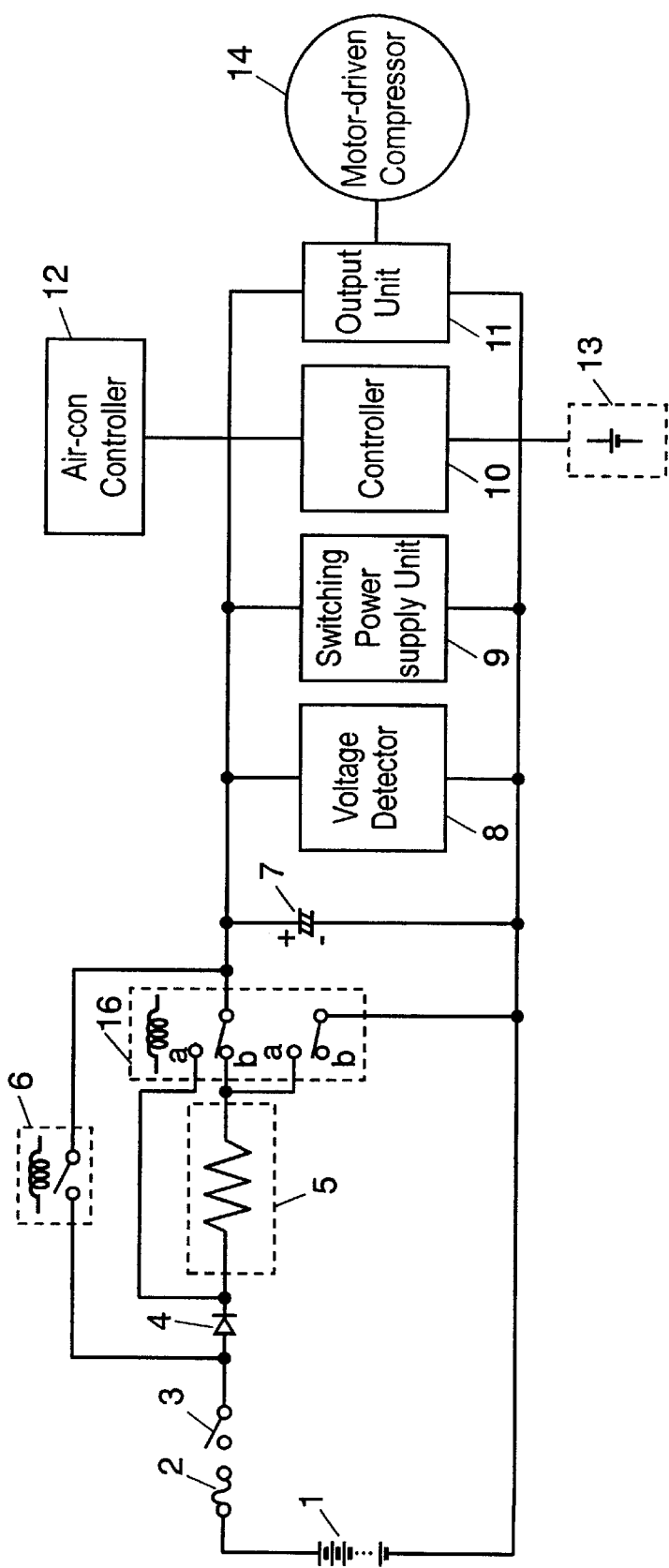
FIG. 1 is a block diagram of an automobile air conditioner in embodiment 1 of the invention.

Referring now to the drawings, preferred embodiments of the invention are described below.

(Embodiment 1)

FIG. 1 is a block diagram of an automobile air conditioner in embodiment 1 of the invention.

In FIG. 1, when a circuit breaker 3 is closed, a capacitor 7 is charged by a battery 1 by way of fuse 2, circuit breaker 3, diode 4, resistor 5, and charge/discharge changeover relay 16. At this time, the relay 16 is closed at the contact (b) side as shown in FIG. 1.

When driving a motor-driven compressor 14, a controller 10 receives a command for operating the motor-driven compressor 14 from an air conditioner controller 12, and checks the charge voltage of the capacitor 7 detected by a voltage detector. When the voltage detected by the voltage detector 8 has reached a specified value, the controller 10 closes a relay 6. Then, the motor-driven compressor 14 is driven by an output unit 11.

To stop the motor-driven compressor 14, the controller 10 receives a stop command of the motor-driven compressor 14 from the air conditioner controller 12, and stops the output from the output unit 11, and then opens the relay 6.

When the relay 6 is opened, the electric charge in the capacitor 7 is discharged. Discharge operation is explained in the following. The air conditioner controller 12 first opens the circuit breaker 3, and issues a discharge command to the controller 10. Then, the controller 10 closes the charge/discharge changeover relay 16 to the contact (a) side. As a result, the electric charge in the capacitor 7 is discharged through the charge/discharge changeover relay 16 and resistor 5.

In this embodiment, the resistance value of the resistor 5 is tens of ohms, the capacitance of the capacitor 7 is 1000 μF, and the discharge time is about 1 second. On the other hand, the discharge time by the switching power supply unit 9 is about tens of seconds. That is, the discharge time in this embodiment is about tens of times faster.

Thus, according to the embodiment, a resistor of large capacity is not needed separately for discharging, and the electric charge in the capacitor 7 can be discharged only by the software for operating the charge/discharge changeover relay 16. Hence, the size of the apparatus can be reduced. Further, without requiring connection of motor-driven compressor or complicated software, the electric charge in the capacitor can be discharged promptly.

(Embodiment 2)

Figure 2:
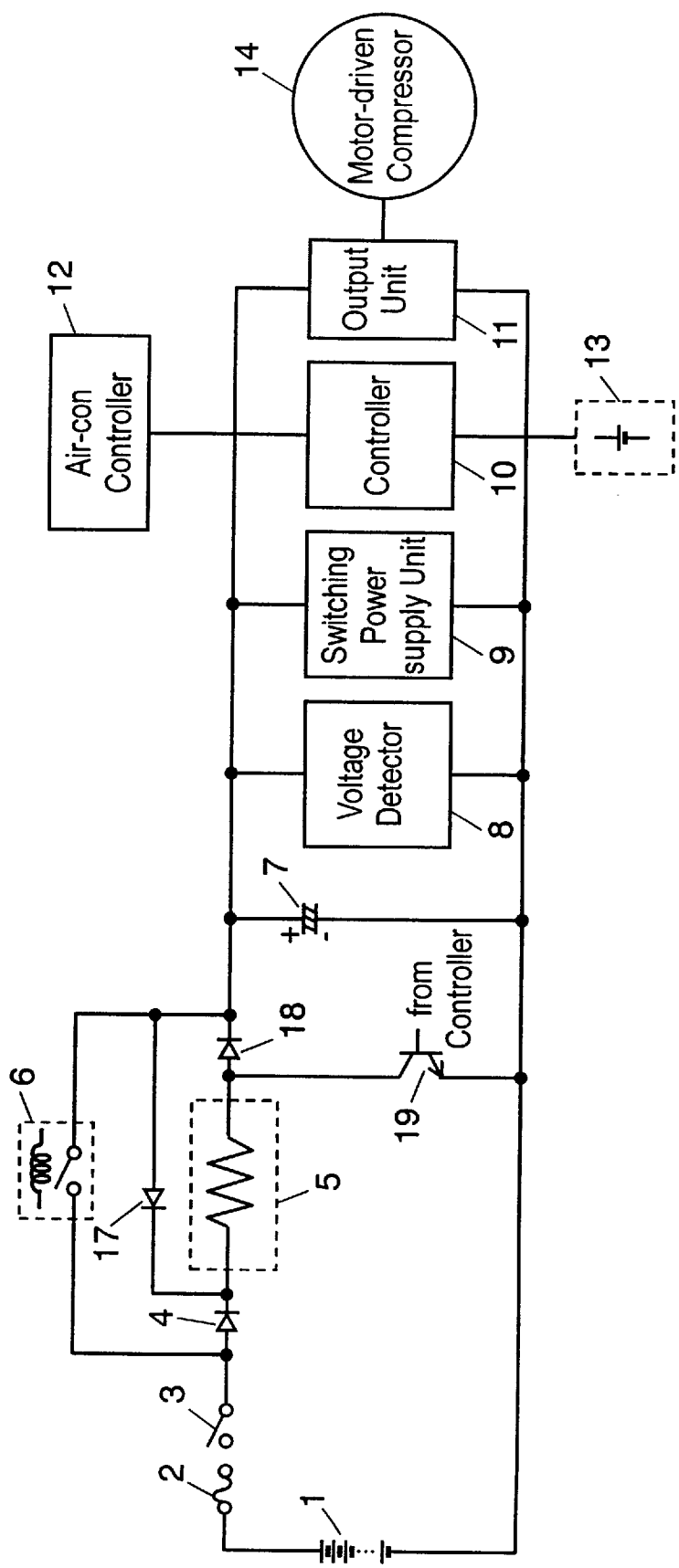
FIG. 2 is a block diagram of an automobile air conditioner in embodiment 2 of the invention.

FIG. 2 is a block diagram of an automobile air conditioner in embodiment 2 of the invention. In FIG. 2, same components as in FIG. 1 are identified with same reference numerals, and detailed explanation is omitted.

In this embodiment, the charge/discharge changeover relay 16 in embodiment 1 is replaced by diodes 17, 18, and a transistor 19.

When a circuit breaker 3 is closed, a capacitor 7 is charged by a battery 1 by way of fuse 2, circuit breaker 3, diode 4, resistor 5, and diode 18. At this time, the transistor 19 is turned off.

Discharge operation of the capacitor 7 is explained in the following. The air conditioner controller 12 first opens the circuit breaker 3, and issues a discharge command to the controller 10. Receiving the discharge command, the controller 10 turns on the transistor 19. As a result, the electric charge in the capacitor 7 is discharged through the diode 17, resistor 5, and transistor 19. At this time, the diode 18 prevents the current from flowing directly from the capacitor 7 to the transistor 19 to break it down. Hence, according to the embodiment, since the semiconductors are used instead of the relay 16 in embodiment 1, the apparatus is reduced in size, and the durability of the apparatus can be enhanced.

(Embodiment 3)

Figure 3:
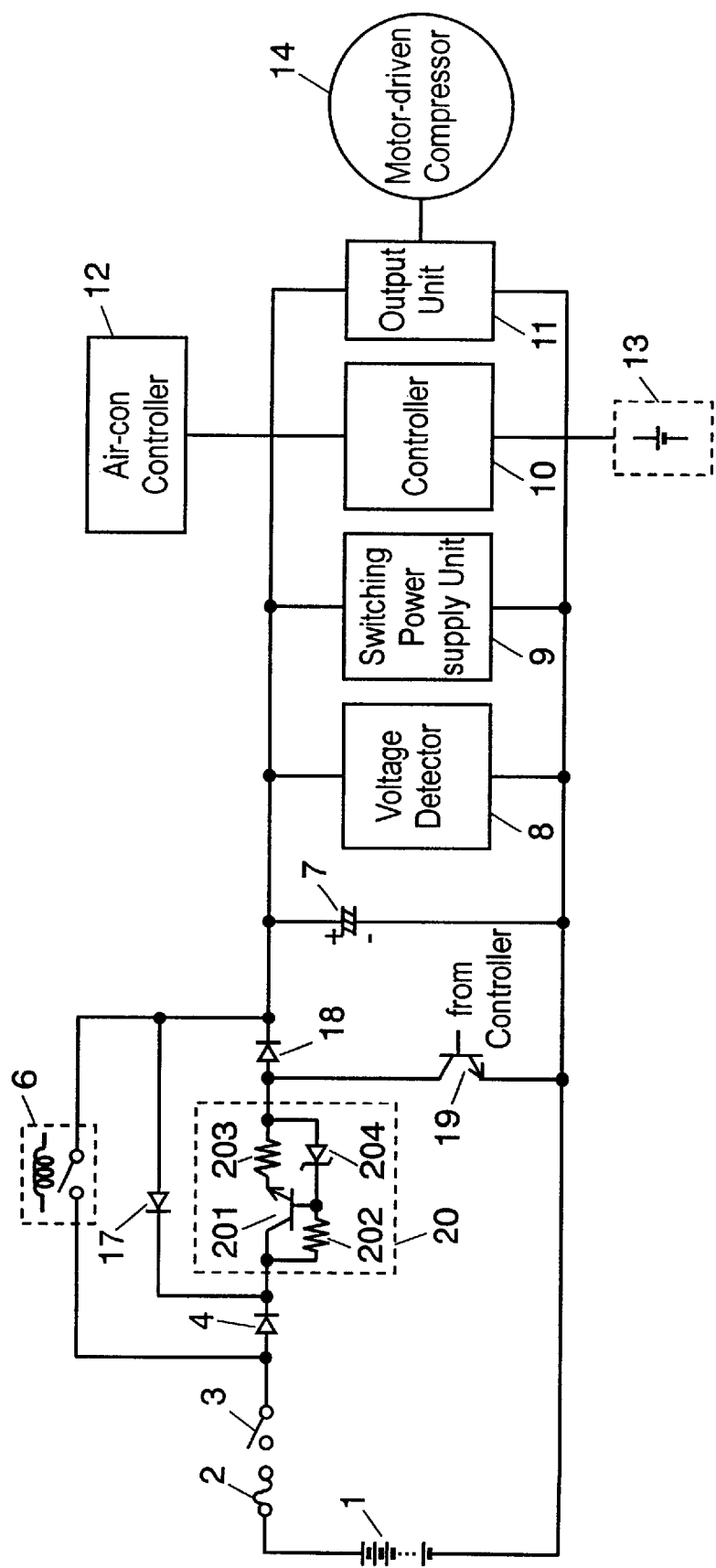
FIG. 3 is a block diagram of an automobile air conditioner in embodiment 3 of the invention.

FIG. 3 is a block diagram of an automobile air conditioner in embodiment 3 of the invention. In FIG. 3, same components as in FIG. 2 are identified with same reference numerals, and detailed explanation is omitted.

In this embodiment, the resistor 5 in embodiment 2 is replaced by a constant current circuit 20.

The constant current circuit 20 is, as shown in FIG. 3, composed of a transistor 201, resistors 202, 203, and a Zener diode 204. The constant current circuit 20 continues to charge the capacitor 7 at a constant current until its voltage becomes about $V_{c1}$ ($V_{c1}=V_s-2V_d-V_z$, where $V_s$ is output voltage of battery 1, $V_d$ is forward voltage of diodes 4, 18, and $V_z$ is Zener voltage of Zener diode 204). Then the capacitor 7 is charged up to about $V_{c2}$ ($V_{c2}=V_s-2V_d-V_{be}$, where $V_{be}$ is base-emitter voltage of transistor 201, $V_{be}<V_z$).

Same as in embodiment 2, when the relay 6 is open, receiving the discharge command from the air conditioner controller 12, the controller 10 turns on the transistor 19, and the electric charge in the capacitor 7 is discharged. That is, when the transistor 19 is turned on, the electric charge in the capacitor 7 is discharged through the diode 17, constant current circuit 20, and transistor 19. At this time, the constant current circuit 20 discharges the electric charge at a constant current until the voltage of the capacitor 7 becomes about $V_{d1}$ ($V_{d1}=V_d+V_z$, the forward voltage of diode 17 is also $V_d$). Then the capacitor 7 is further discharged until the voltage becomes about $V_{d2}$ ($V_{d2}=V_d+V_{be}$). Herein, $V_d$ is about 0.7 V. In the embodiment, $V_z$ is about 3 V.

For example, supposing the voltage of battery 1 to be 200 V, the capacitance of capacitor 7 to be 1000 μF, and the constant current to be 0.2 A, both the charge time and discharge time is 1 second (200 V×1000 μF/0.2 A). The discharge time by the switching power supply unit 9 is about tens of seconds conventionally. That is, the discharge speed is about tens of times faster in this embodiment.

According to the embodiment, the value of discharge current can be set arbitrarily. As compared with embodiment 1 or 2, the maximum current can be smaller, and a circuit element of a small rated current value can be used, so that the apparatus is further reduced in size.

(Embodiment 4)

Figure 4:
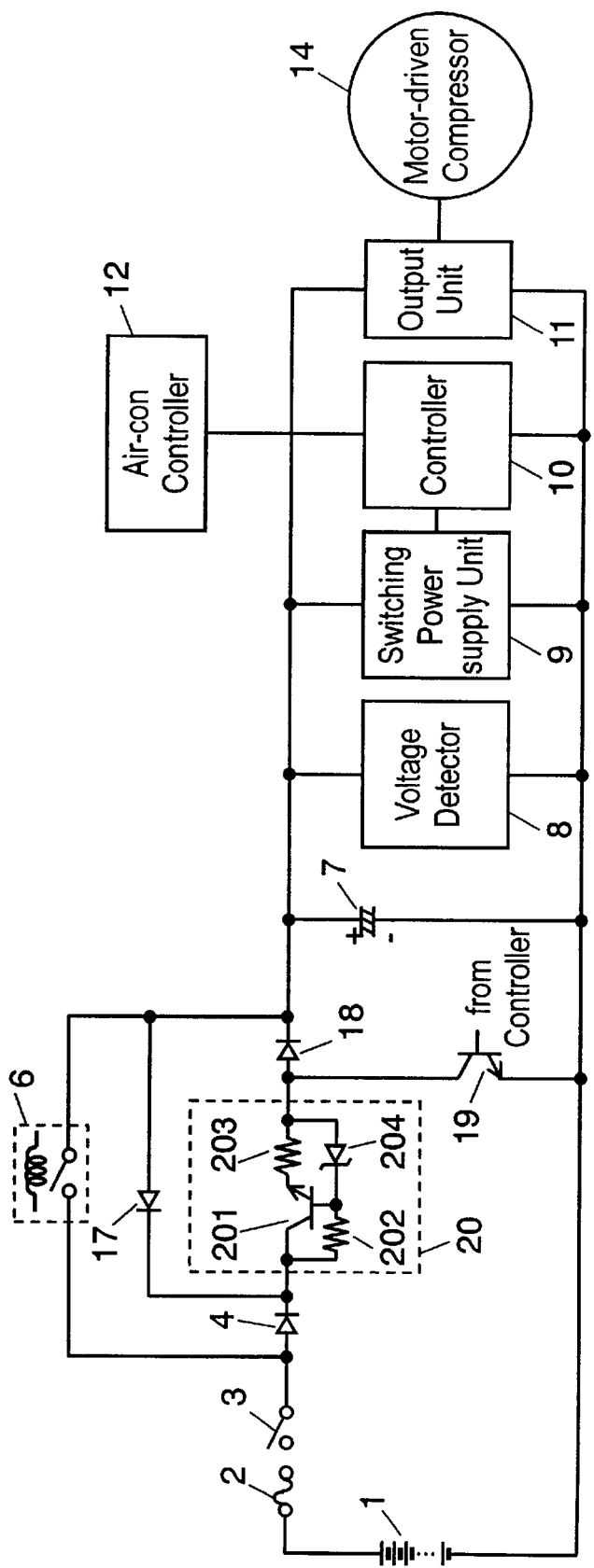
FIG. 4 is a block diagram of an automobile air conditioner in embodiment 4 of the invention.

FIG. 4 is a block diagram of an automobile air conditioner in embodiment 4 of the invention. In FIG. 4, same components as in FIG. 3 are identified with same reference numerals, and detailed explanation is omitted.

In this embodiment, instead of the power source 13 of the controller 10 in embodiment 3, it is designed to feed a supply voltage of 12 V from the switching power supply unit 9 to the controller 10.

In the embodiment, the transistor 19 remains in ON state until the supply voltage of the controller 10 declines and the controller 10 fails to operate. When the supply voltage of the controller 10 declines and the controller 10 fails to operate, the transistor 19 is turned off, and discharge of the capacitor 7 stops. Thereafter, the electric charge in the capacitor 7 is discharged by the switching power supply unit 9 as the load.

This embodiment does not require external power source 13 as used in embodiments 1 to 3. That is, when discharging the electric charge in the capacitor 7, it is not necessary to connect the 12 V power source 13, and the work for discharge is simple and easy. When starting checking, discharge is possible by disconnecting immediately.

Figure 5:
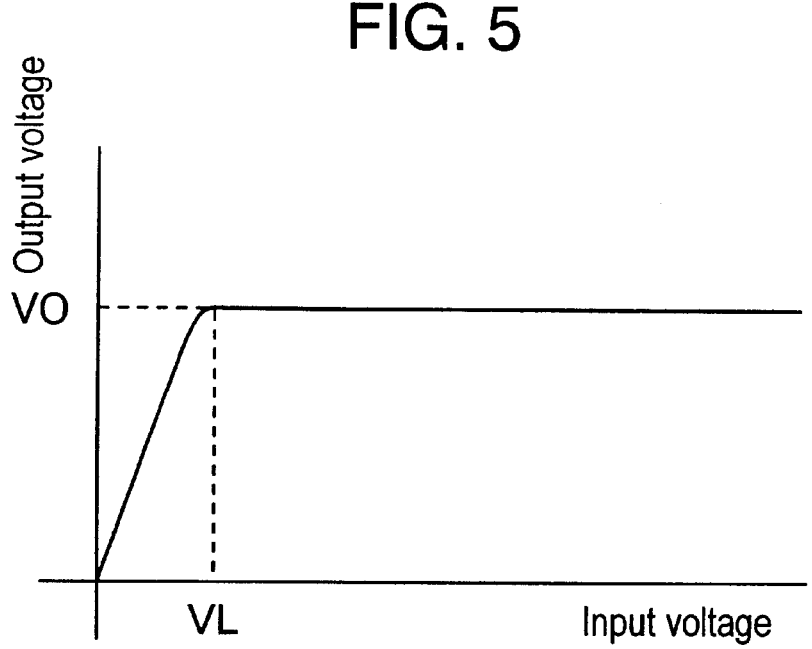
FIG. 5 is a characteristic diagram of a switching power supply unit in embodiment 4 of the invention.

FIG. 5 is a diagram showing characteristics of supply voltage supplied from the switching power supply unit 9 to the controller 10 in this embodiment. In FIG. 5, the input voltage on the axis of abscissas is the input voltage to the switching power supply unit 9, which is equal to the voltage of the capacitor 7. When the input voltage is higher than VL, the switching power supply unit 9 delivers a voltage at rated supply voltage V0 of the controller 10. In this embodiment, V0 is 5 V. When the input voltage becomes lower than VL, as shown in FIG. 5, the output voltage also declines. The controller 10 operates at the rated voltage VO (5 V), but substantially operates until the voltage becomes lower than 3 V. That is, from the time of the voltage of the capacitor 7 becoming lower than VL until the output voltage becomes 3 V, the electric charge in the capacitor 7 is discharged through the constant current circuit 20. When the supply voltage becomes lower than 3 V, and the controller 10 stops, the transistor 19 is turned off. As a result, the constant current circuit 20 stops, and the voltage of the capacitor 7 at this time is lower than VL. When this voltage VL is set at a low voltage not to cause trouble in checking and repairing at the time of designing of the switching power supply unit 9, same as in the foregoing embodiments, checking or repairing can be started in a short time.

Figure 6:
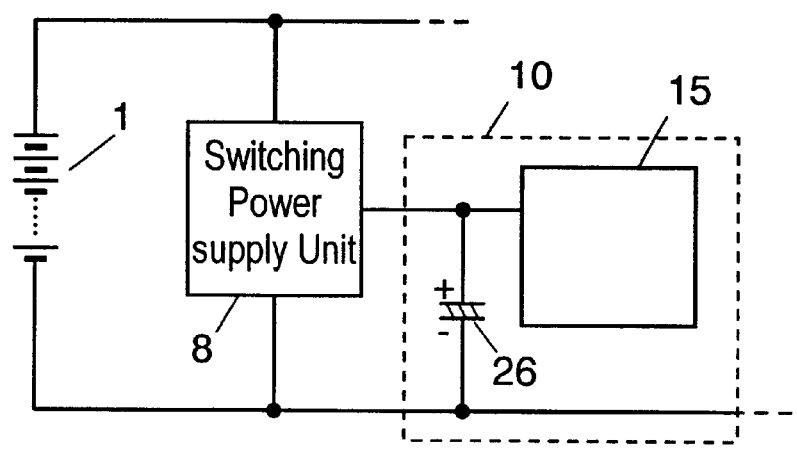
FIG. 6 is a block diagram of a controller in embodiment 4 of the invention.

FIG. 6 is a block diagram of the controller 10 in this embodiment. The controller 10 comprises a microcomputer 15 for starting the control software, and a capacitor 26 connected to the 5 V power source terminal of the microcomputer 15. The capacitance of the capacitor 26 is set at a value enough to hold the supply voltage of the microcomputer 15 at 5 V for more than the time required to discharge the capacitor 7 sufficiently. Since the microcomputer 15 substantially operates at about 3 V, the voltage may be lowered to 3 V. (The standstill of the microcomputer 15 means the standstill of the controller 10.). Therefore, until the capacitor 7 is discharged sufficiently, the controller 10 and discharge circuit function, and the capacitor 7 is discharged completely in a short time (in 1 second by applying an example of embodiment 3). Hence, checking or repairing can be started in a short time.

(Embodiment 5)

Figure 7:
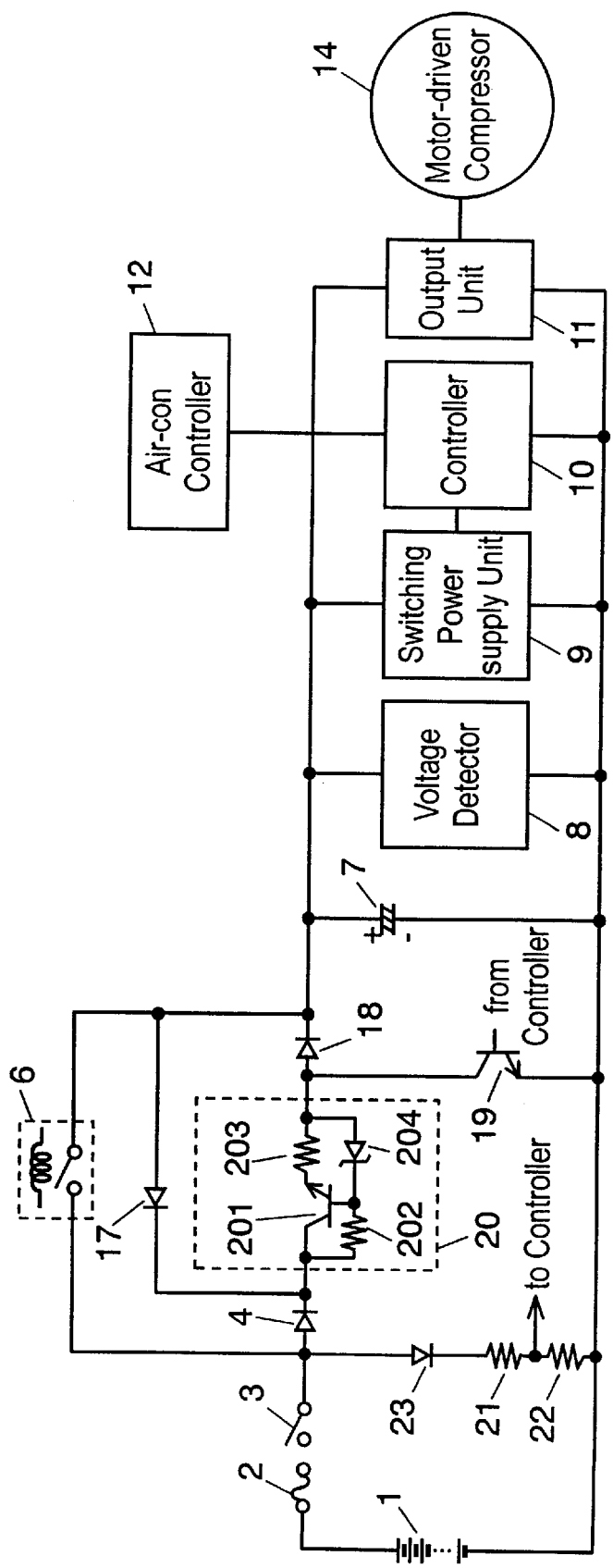
FIG. 7 is a block diagram of an automobile air conditioner in embodiment 5 of the invention.

FIG. 7 is a block diagram of an automobile air conditioner in embodiment 5 of the invention. In FIG. 7, same components as in FIG. 4 are identified with same reference numerals, and detailed explanation is omitted.

In this embodiment, a cut-off detecting circuit for detecting that the connection of the battery 1 is cut off is added to the configuration in embodiment 4. The cut-off detecting circuit is composed of a resistor 21, a resistor 22, and a diode 23. A potential voltage by the resistor 21 and resistor 22 is fed into the controller 10. The diode 23 is a protective diode provided for the same purpose as the diode 4.

In the embodiment, the electric charge in the capacitor 7 is discharged regardless of the signal from the air conditioner controller 12. When the connection of the battery 1 is cut off, for example, due to opening of the circuit breaker 3, melting of fuse 2, or disconnection of connector, the potential voltage by the resistor 21 and resistor 22 becomes about 0 V. The controller 10 judges this about 0 V as a discharge signal, and turns on the transistor 19 for discharging. As a result, the electric charge in the capacitor 7 is discharged by way of the diode 17, constant current circuit 20, and transistor 19.

According to the embodiment, the controller 10 controls the discharge circuit according to the signal from the cut-off detecting circuit, and hence discharge can be started without receiving signal from the air conditioner controller 12 (in other word, without receiving a cutoff signal of direct-current power source from outside). Therefore, at the time of checking or repairing, by cutting off the battery 1 by detaching the connector or the like, the capacitor 7 can be discharged easily. If the fuse is blown, meanwhile, discharge can be done without requiring any particular work.

(Embodiment 6)

Figure 8:
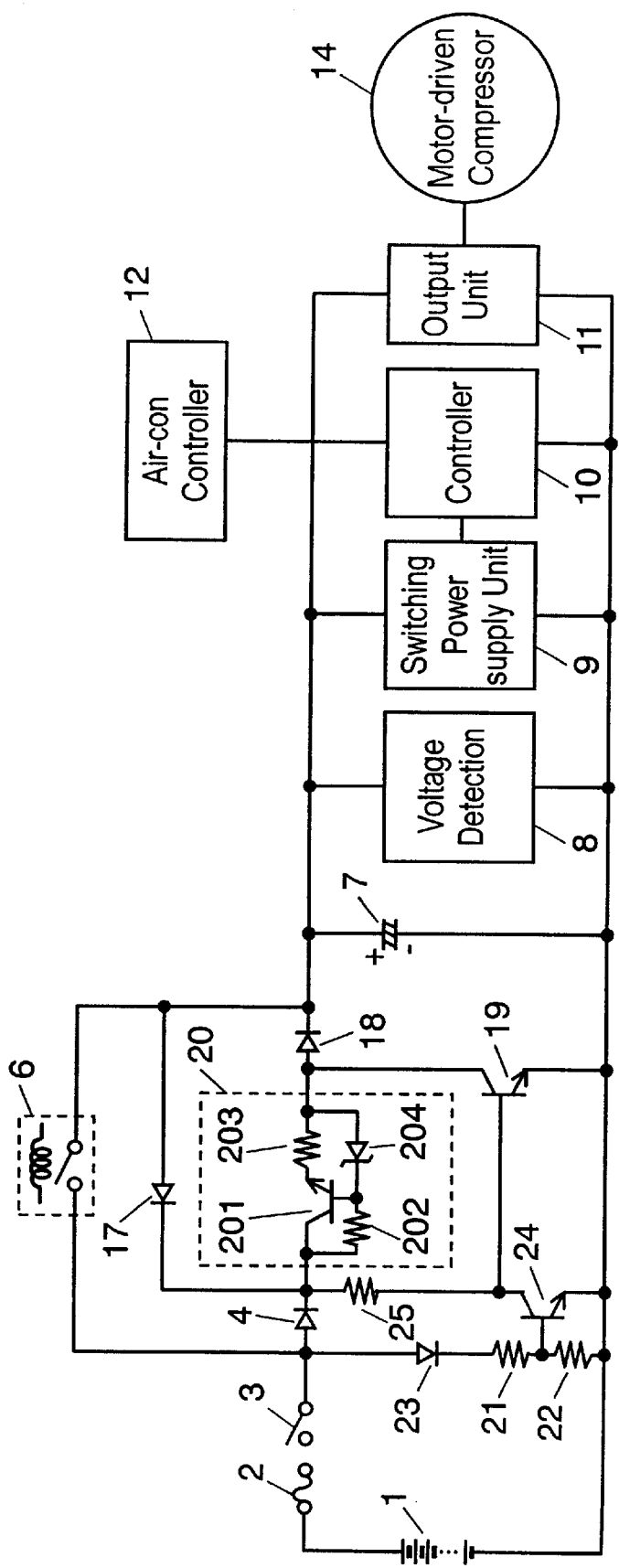
FIG. 8 is a block diagram of an automobile air conditioner in embodiment 6 of the invention.
Figure 9:
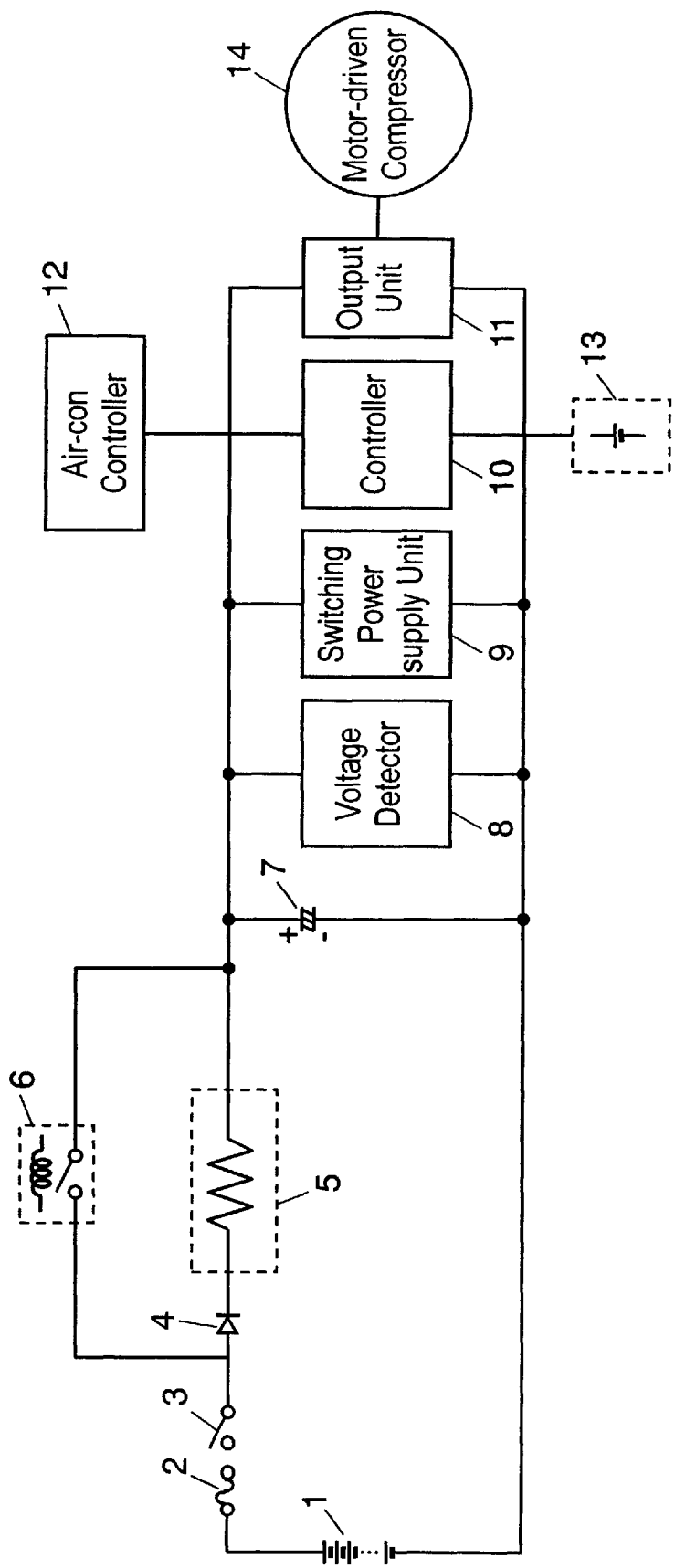
FIG. 9 is a block diagram of an automobile air conditioner in a prior art.

FIG. 8 is a block diagram of an automobile air conditioner in embodiment 6 of the invention. In FIG. 8, same components as in FIG. 7 are identified with same reference numerals, and detailed explanation is omitted.

In this embodiment, the cut-off detecting circuit of embodiment 5 in FIG. 7 is designed to drive the transistor 19 directly.

While the battery 1 is not cut off, a transistor 24 is turned on by the potential voltage by the resistor 21 and resistor 22, and the collector voltage of the transistor 24 becomes about 0 V. Therefore, the base voltage of the transistor 19 is about 0 V, and the transistor 19 is in OFF state.

When the electric charge in the capacitor 7 is discharged, it is discharged regardless of the signal from the air conditioner controller 12. When the connection of the battery 1 is cut off, for example, due to opening of the circuit breaker 3, melting of fuse 2, or disconnection of connector, the potential voltage by the resistor 21 and resistor 22 becomes about 0 V, and the base voltage of the transistor 24 also becomes about 0 V, so that the transistor 24 is turned off. When the voltage of the capacitor 7 is applied to the base terminal of the transistor 19 through the diode 17 and resistor 25, the transistor 19 is turned on. As a result, the electric charge in the capacitor 7 is discharged by way of the diode 17, constant current circuit 20, and transistor 19.

According to the embodiment, since the discharge circuit is directly controlled by the cut-off detecting circuit, the controller 10 does not require software for discharging, and discharge can be started by the hardware circuit only. Therefore, the software of the controller 10 is lighter in load, and regardless of the situation of the controller 10, for example, if the supply voltage is lowered and the controller 10 fails to function, discharge can be started.

In the foregoing embodiments, the resistor 5 or constant current circuit 20 is used as the power feeding device, but the same effects are obtained by using other means.

What is claimed is:

1. An automobile air conditioner comprising:
   a direct-current power source;
   a power feeding device connected in series to said direct-current power source;
   a switching device connected parallel to said power feeding device;
   a first capacitor charged through said power feeding device from said direct-current power source;
   an output unit for driving a motor-driven compressor for air conditioning, said output unit being supplied with an electric power from said direct-current power source through said switching device;
   a discharge circuit for discharging the electric charge in said first capacitor through said power feeding device; and
   a controller for controlling said discharge circuit.

2. The automobile air conditioner of claim 1, further comprising:
   a switching power supply unit for converting the voltage of said direct-current power source into a supply voltage for said controller, and producing the supply voltage for said controller.

3. The automobile air conditioner of claim 2,
   wherein said controller has a second capacitor for maintaining the supply voltage for operating said controller until the voltage of said first capacitor becomes lower than specified voltage by discharge.

4. The automobile air conditioner of claim 3,
   wherein said second capacitor has capacitance for maintaining the supply voltage for operating the controller until said first capacitor is discharged completely.

5. The automobile air conditioner of claim 1, further comprising:
   a cut-off detecting unit for detecting that the supply of power from said direct-current power source is cut off,
   wherein said controller controls the discharge circuit on the basis of the signal from said cut-off detecting unit.

6. The automobile air conditioner of claim 1, wherein said discharge circuit includes a current blocking device and a first switch means, said current blocking device preventing the first capacitor from being directly coupled to said first switch means during discharge of the first capacitor.

7. The automobile air conditioner of claim 6, wherein said current blocking device comprises a diode.

8. The automobile air conditioner of claim 6, wherein said first switch means comprises a transistor.

9. The automobile air conditioner of claim 1, wherein said power feeding means comprises a constant current circuit.

10. The automobile air conditioner of claim 9, wherein current flows through the power feeding means in the same direction during charging of the first capacitor and discharging of the first capacitor.

11. The automobile air conditioner of claim 6, wherein said first switch means couples an output of said power feeding means to a ground source during discharge so as to form a discharge path for said first capacitor.

12. The automobile air conditioner of claim 1, wherein said discharge circuit further comprises a second switch means which couples the first capacitor to an input of said power feeding means during discharge of the first capacitor.

13. The automobile air conditioner of claim 12, wherein said second switch means comprises a diode.

14. An automobile air conditioner comprising:

a direct-current power source;

a power feeding device connected in series to said direct-current power source;

a switching device connected parallel to said power feeding device;

a capacitor charged through said power feeding device from said direct-current power source;

an output unit for driving a motor-driven compressor for air conditioning, said output unit being supplied with an electric power from said direct-current power source through said switching device;

a discharge circuit for discharging the electric charge in said capacitor through said power feeding device; and a cut-off detecting unit for detecting that the supply of power from said direct-current power source is cut off, wherein said discharge circuit discharges the electric charge in said capacitor on the basis of the output signal from said cut-off detecting unit.

* * * * *